United States Patent Office 2,896,000
Patented July 21, 1959

2,896,000

PROCESS FOR THE MANUFACTURE OF VINYL CHLORIDE

Franklyn D. Miller and Donald P. Jenks, Cincinnati, Ohio, assignors to National Distillers and Chemical Corporation, New York, N.Y., a corporation of Virginia No Drawing. Application May 9, 1955
Serial No. 507,134

3 Claims. (Cl. 260—656)

The present invention relates to an improved process for direct halogenation of ethylene to produce vinyl halides and, more particularly, to an improved process for chlor-substitution of ethylene to produce vinyl chloride.

The invention is based on the discovery that, in a halo-substitution process, utilizing ethylene and a suitable halide as reactants, an improved yield of vinyl halide, based on the amount of halogen reactant employed, may be obtained by carrying out the reaction in the presence of a controlled amount of ethylene dihalide. More specifically, the invention relates to reacting ethylene with chlorine under chlor-substitution reaction conditions in the presence of a relatively small but controlled amount of ethylene dichloride whereby increased utilization of chlorine occurs in formation of vinyl chloride with suppression of formation of additional ethylene dichloride and substantial amounts of chlorine-containing hydrocarbon compounds other than vinyl chloride. Still more specifically, the invention comprises reacting ethylene and chlorine under chlor-substitution reaction conditions in the presence of ethylene dichloride wherein, on a mol basis, ethylene is employed in an amount substantially in excess of chlorine, and ethylene dichloride is present during the reaction in an amount not exceeding the chloride on a mol basis but in an amount sufficient to provide the improved results embodied herein. In preferred embodiment, the process of this invention is carried out by use of ethylene in a ratio of about seven or more mols to one mol of chlorine and ethylene dichloride in an amount less than chlorine, on a mol basis, but in excess of about 0.3 mol of ethylene dichloride per mol of chlorine. In a more preferred aspect, the invention is carried out by use of from about seven to about ten mols of ethylene, and from about 0.4 to about 0.8 mol of ethylene dichloride, to one mol of chlorine.

In order to illustrate the invention and the improvements that result therefrom, the following tabulation sets forth data obtained from several runs made in accordance with embodiments of this invention which for illustration purposes, is described with respect to preparation of vinyl chloride. For comparative purposes, the tabulation also contains data on a substantially similar run in which an amount of ethylene dichloride, other than embodied herein, was employed.

The runs for which data are set forth were carried out in apparatus consisting of a jacketed (Glass-Col quartz heating-mantle) glass tube reactor, one inch in diameter and twenty inches in length, having two openings at the bottom for introduction of ethylene (at 300° C.) and ethylene dichloride in super-heated vapor form, respectively; two orificed openings, spaced two inches and twelve inches, respectively, from the bottom of the reactor for introduction of chlorine at a linear velocity above the flame propagation rate of chlorine with ethylene; and an opening in the top portion for withdrawal of effluent gases from the reactor. The effluent gas from the reactor was passed through an air condenser, a water scrubber for substantial removal of hydrogen chloride present in the effluent gas, a caustic scrubber for absorption of any free chlorine, a drying tower (Drierite), and four cold traps, in series, the first of which contained ice water and the last three of which contained Dry Ice and methanol. Effluent gas from the last trap was passed through a wet test meter and gas exiting from the meter was analyzed for vinyl chloride and acetylene content. Liquid collected in each of the four cold traps was weighed, combined and distilled to determine the amount of ethylene, vinyl chloride and high boiling material present in the collected liquids. The water and the caustic collected from the water scrubber and the caustic scrubber, respectively, were analyzed for hydrogen chloride and chlorine content.

In the following tabulation, which sets forth details pertaining to reactant proportions and reaction conditions employed in the runs for which data are shown, the yield shown for vinyl chloride is based on the percentage of chlorine employed in the reaction and, hence, does not include any vinyl chloride that may have formed by cracking of ethylene dichloride added to the reaction.

| | Run No. | | | |
|---|---|---|---|---|
| | I | II | III | IV |
| Length of run (minutes) | 180 | 180 | 180 | 180 |
| Temperature, ° C. (bottom to top of reactor) | 373–466 | 294–451 | 307–475 | 334–460 |
| Space velocity (seconds) | 0.227 | 0.266 | 0.263 | 0.228 |
| Ethylene added (mols) | 21.6 | 25.6 | 24.7 | 21.2 |
| Chlorine added (mols) | 2.52 | 2.66 | 3.2 | 2.97 |
| Mol ratio, ethylene: $Cl_2$ | 8.50 | 9.60 | 7.7 | 7.5 |
| Ethylene chloride: | | | | |
| Mols added | 0.81 | 1.57 | 1.52 | 2.44 |
| Mols removed | 1.23 | 1.27 | 1.21 | 1.79 |
| Mols made | 0.42 | | | |
| Mols used | | 0.30 | 0.31 | 0.65 |
| Mol ratio of ethylene dichloride: $Cl_2$ | 0.32 | 0.59 | 0.475 | 0.82 |
| Chlorine accountability: | | | | |
| Mols added as $Cl_2$ | 2.52 | 2.66 | 3.2 | 2.97 |
| Mols added as ethylene dichloride | 0.81 | 1.57 | 1.52 | 2.44 |
| Total mols added | 3.33 | 4.23 | 4.72 | 5.41 |
| Mols in water wash | 1.48 | 1.65 | 2.03 | 2.08 |
| Mols in vinyl chloride | 0.58 | 1.21 | 1.33 | 1.43 |
| Mols in ethylene dichloride | 1.23 | 1.27 | 1.21 | 1.79 |
| Total mols of chlorine recovered | 3.29 | 4.13 | 4.57 | 5.20 |
| Percent recovered | 98.0 | 97.5 | 96.5 | 95.5 |
| Yield of vinyl chloride based on chlorine, percent | 46.0 | 80.0 | 73.5 | 74.5 |

With reference to the data set forth for run I, in which a mol ratio of ethylene to chlorine of 8.50 to 1 and a mol ratio of ethylene dichloride to chlorine of 0.32 to 1 were employed, a 46% yield of vinyl chloride was obtained and, in that run, production of ethylene dichloride occurred. Such a yield of vinyl chloride, based on the amount of chlorine employed in the reaction, is typical of optimum yields of vinyl chloride obtained in carrying out numerous runs for chlor-substitution reaction of ethylene in similar manner but without the presence of added ethylene dichloride during the reaction.

Whereas the yield of vinyl chloride, based on chlorine employed in the reaction, amounted to 46% in run I, markedly increased yields of vinyl chloride on a corresponding basis were obtained in runs II, III, and IV. In the latter three runs, illustrating practice of the present invention, a substantial excess of ethylene over chlorine was employed as was also the case in run I. However, whereas in run I an ethylene dichloride to chlorine ratio of 0.32 to 1 was employed, a higher ratio was used in runs II, III, and IV, and in each of the latter three runs, the amount of ethylene dichloride employed was less than a mol to mol ratio with chlorine. As shown, the highest yield of vinyl chloride (i.e., 80% based on the chlorine employed) was obtained in run II wherein a ratio of ethylene dichloride to chlorine of 0.59 to 1 was used. As is further apparent from the data in the tabulation, formation of additional ethylene dichloride was suppressed in runs II, III, and IV, whereas ethylene dichloride formation occurred in run I carried out with a ration of ethylene dichloride:chlorine other than embodied herein.

In carrying out the process embodied herein, the temperature employed may be varied within the range of about 300° to 500° C., but preferably is maintained within the range of 350 to 475° C. As to the mode of addition of chlorine to the reaction, it is preferable, as is known to those skilled in the art, that chlorine addition be made at a high velocity such as to exceed the flame propagation rate of chlorine with ethylene whereby to minimize burning of the chlorine which would result in formation of carbon and hydrochloric acid to an objectionable degree. Moreover, chlorine is preferably introduced into the reaction zone at a plurality of points in the manner set forth in describing the aforesaid embodiment of the invention, and in which chlorine addition was made through two orificed openings at different points in the reactor.

As will be apparent to those skilled in the art, ethylene dichloride and unreacted ethylene recovered from the reaction may be recovered and recycled in the system with adjustment, if necessary, of the amount of ethylene dichloride recycled, based on the amount of chlorine employed, so as to provide in the reaction mixture the controlled ratio of ethylene dichloride to chlorine as aforedescribed.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for chlorination of ethylene to vinyl chloride which comprises reacting ethylene with chlorine at a temperature within the range of about 300 to 500° C., the ethylene being in molar excess in relation to the chlorine, in the presence of ethylene dichloride in molar proportion of substantially more than 0.3 to about one mol of ethylene dichloride to one mol of chlorine.

2. A process for chlorination of ethylene to vinyl chloride which comprises reacting ethylene with chlorine at a temperature of about 300 to about 500° C., in the presence of ethylene dichloride, wherein the proportion of ethylene to chlorine is from about seven to about ten mols of ethylene to one mol of chlorine and the proportion of chlorine to ethylene dichloride is one mol of chlorine to substantially more than 0.3 and up to 0.8 mol of ethylene dichloride.

3. A process of chlorination of ethylene to vinyl chloride which comprises reacting ethylene with chlorine at a temperature of from about 300 to about 500° C., in the presence of ethylene dichloride, wherein the mol ratio of ethylene to chlorine is about 9.6:1 and the mol ratio of ethylene dichloride to chlorine is about 0.6:1.

References Cited in the file of this patent

UNITED STATES PATENTS

| 2,167,927 | Groll et al. | Aug. 1, 1939 |
| 2,569,923 | Cheney | Oct. 2, 1951 |
| 2,577,388 | Warren | Dec. 4, 1951 |

OTHER REFERENCES

Prutton et al.: "Fundamental Principles of Physical Chemistry," (1951), Macmillan Co., N.Y., pages 336 and 341.